United States Patent Office 3,361,831
Patented Jan. 2, 1968

3,361,831
CHLORINE-CONTAINING SURFACE
ACTIVE AGENTS
Thomas Eugene Brunelle, St. Paul, Larry Monroe Rue, South St. Paul, and Samuel Brown Crecelius, St. Paul, Minn., assignors to Economics Laboratory, Inc., St. Paul, Minn., a corporation of Delaware
No Drawing. Filed Aug. 7, 1963, Ser. No. 300,637
12 Claims. (Cl. 260—611)

This invention relates to new chemical products having surface active properties. The novel chemical products of this invention can be characterized as chlorine-containing, low-foaming, nonionic surface active agents having generally useful detergent properties.

In accordance with this invention a new class of chlorine-containing chemical compounds has been discovered which have outstanding surface active and detergent properties. These new compounds are synthesized by first polymerizing an epoxy compound with epichlorohydrin and finally condensing the resulting intermediate polymer with ethylene oxide. Boron trifluoride is used as a catalyst in the preparation of the new compounds of the invention under controlled temperature conditions.

The compounds of the invention can be represented by the following generic formula:

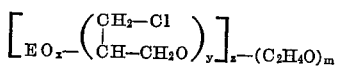

wherein:

E is an epoxy compound
$x$ is an integer
$y$ is an integer
Z represents a copolymer of epichlorohydrin and an epoxy compound which copolymer is an intermediate in the preparation of the compounds of this invention. The values of $x$ and $y$ are such that the molecular weight of Z varies from about 1200 to about 1500 as determined by hydroxyl number.
$m$ is an integer such that the oxyethylene groups constitute from 40 to 70% by weight of the final product. The molecular weight of the final product $(Z+(C_2H_4O)_m)$ ranges from about 1800 to 3700 as determined by hydroxyl number.

The epoxy compounds which can be reacted with epichlorohydrin to form the intermediate random copolymer can be varied and generally comprise alkylene oxide compounds. Representative of these compounds are ethylene oxide, propylene oxide, butylene oxide, styrene oxide and the like. The proportion of the epoxide to epichlorohydrin can also be varied widely and in general can range from 5:95 to 95:5 by weight more or less.

The novel surface active agents of the invention are formed in two steps. The first step involves the formation of a copolymer of epichlorohydrin and the epoxy compound and this intermediate copolymer is then condensed with ethylene oxide in a second step. In the preparation of these compounds, boron trifluoride is employed as catalyst. While the boron trifluoride gas can be employed, it is generally more convenient to employ the catalyst in the form of an ether complex. The ether moiety of the complex is variable and various ethers can be employed such as methyl ether, ethyl methyl ether, ethyl ether, ethyl propyl ether, n-propyl ether, vinyl ether, methylal, acetal, anisole, phenetole, phenyl ether and the like. Boron trifluoride-ether complexes having varying concentrations of the boron trifluoride are commercially available. In general, the catalyst, that is the boron trifluoride, is employed in an amount ranging from about 0.1 to 0.5% by weight of total weight of reactants. The catalyst when employed in the form of an ether complex can be introduced in a suitable carrier such as a low-boiling hydrocarbon, as cyclohexane or water and the like.

Formation of the intermediate copolymer of epichlorohydrin and the epoxy compound and condensation of the intermediate with ethylene oxide are preferably carried out under pressure. Pressures ranging from about 0 to about 50 pounds per square inch are suitable, while pressures in the range of 10 to 30 are preferred. Moreover, the temperature at which both steps are conducted should not be permitted to go substantially above about 100° C. Preferred temperatures for conducting the various reactions are from 50 to 70° C.

According to one preferred procedure, the catalyst, in a suitable carrier such as cyclohexane, is introduced into a pressure reactor provided with means for agitating the reaction mixture and means for controlling the temperature of the reaction. After introduction of the catalyst, the reactor is flushed with an inert gas such as nitrogen and a pressure developed of between about 20 and 50 pounds per square inch. A homogeneous mixture of the epoxide and epichlorohydrin, in proportions varied as indicated above, is then added to the reactor at a controlled rate over a period of several hours such as, for example, 3 to 7 hours or more. The epoxy compound and epichlorohydrin reactants are employed in amounts to provide an intermediate polymer (Z) having a calculated molecular weight of from about 1200 to 1500. The temperature of the reaction mixture is maintained below 100° C. and preferably in the range of 50 to 75° C. As the reaction proceeds, small amounts of the boron trifluoride catalyst can be added to the reactor to maintain the desired catalyst level therein.

After complete addition of the epoxide and epichlorohydrin reactants with formation of the intermediate copolymer corresponding to Z in the above formula, ethylene oxide is introduced into the pressure reactor. The ethylene oxide is likewise added at a controlled rate over a period of hours, suitably 2 to 6 hours or more. Ethylene oxide is employed in an amount to constitute from about 40 to 70% by weight of the final product.

When addition of the required ethylene oxide is completed, the reaction product is removed from the reactor and preferably treated with a base such as potassium hydroxide, sodium hydroxide, sodium carbonate, diethanol amine or the like, to neutralize the acidic boron trifluoride catalyst. This neutralization results in the formation of a salt which is removed by filtration. The reaction product can then be heated at a temperature sufficient to drive off water and other volatiles but not exceeding 150° C. The neutralization and heating steps are desirable when a substantially pure product is desired as in the case of a rinse aid.

The final product is a low-foaming, nonionic surface active agent generally useful as a detergent. The new product has particular utility as a rinse aid component in compositions employed for rinsing dishware, utensils and the like. When utilized as a rinse aid, the novel products of the invention are employed in concentrations of from about 50 to 300 parts per million rinse water. The new products are unique in their ability to wet plastic surfaces, being significantly superior to other known nonionic detergents in this respect. The high viscosity of the products of this invention further enhance their utility as wetting agents. At 25° C. the products of this invention generally have viscosities in the range of 325 to 370 centipoises. Accordingly, when employed in rinse formulations the products of this invention contribute to an increase in the viscosity of the complete rinse composition, thereby rendering it easier to meter accurately and uniformly such rinse formulations through the pump systems employed in the use thereof.

A typical formulation commonly employed for rinsing dishes, utensils and other articles is as follows:

|  | Parts |
|---|---|
| Product of present invention | 27.00 |
| Alkylene polyether alcohol | 10.00 |
| Alkylene polyether alcohol | 5.00 |
| Alkaryl polyether alcohol | 3.00 |
| Alkaryl polyether alcohol | 2.00 |
| Water | 53.00 |
| Preservative | 0.26 |

The following examples further illustrate the preparation of the novel compounds of the invention and the advantages of these new compounds.

EXAMPLE I

Step 1

In a pressure reactor 77.91 grams of cyclohexane were mixed with 2 grams of boron trifluoride-diethyl ether complex. A mixture of 42.46 grams epichlorohydrin and 495.13 grams propylene oxide was then added gradually to the reactor over a period of 5½ hours. The temperature in the reactor was maintained in the range 60° C. to 70° C. and the pressure at about 35 pounds per square inch. After 132 grams of the epichlorohydrin-propylene oxide mixture had been added, the reaction rate slowed and an additional 2 grams of the catalyst complex were added. The reaction again progressed smoothly until a total of 227 grams of the reactant mixture had been added at which time an additional 3 grams of the boron trifluoride-ether complex was added to the reaction mixture. Additions of 3 grams of the boron trifluoride-ether complex were likewise added at such times that 372 grams and 475 grams of the reactant mixture were added to the reactor.

Step 2

After all the epichlorohydrin-propylene oxide mixture had been added to the reactor an additional 2 grams of boron trifluoride-ether complex were added and the addition of 717.50 grams of ethylene oxide initiated. After 261 grams of ethylene oxide has been added, 2 additional grams of the catalyst complex were added and the addition of ethylene oxide completed. The ethylene oxide was added over a period of 5 hours. The resulting product was a light yellow colored liquid, slightly viscous at a temperature of 25° C. This product was neutralized by adding 1.6 N sodium carbonate solution thereto and was then heated to about 150° C. to remove the cyclohexane solvent, water and volatile by-products. Filtration was then carried out to remove the salts formed by the neutralization process leaving as the final product a surface active material having an average molecular weight of approximately 2610 as determined by hydroxyl number.

EXAMPLE II

Step 1

In a pressure reactor, 36.0 grams of water were mixed with 8.00 grams of boron trifluoride-diethyl ether complex. A mixture of 185.04 grams of epichlorohydrin and 990.26 grams of propylene oxide was then added over a period of 1½ hours. The temperature was maintained from 60° C. to 75° C., with a pressure of about 25 pounds per square inch developing. The reaction progressed smoothly and cooling coils with water were used to maintain the temperature in the range specified above.

Step 2

Approximately 304.83 grams of the intermediate product produced above was charged into the pressure reactor together with 4.00 grams of boron trifluoride-diethyl ether complex. Then 247.57 grams of propylene oxide was added over a period of 20 minutes. An additional 2.0 grams of boron trifluoride-diethyl ether complex were added and the addition of 717.50 grams of ethylene oxide started. After 457 grams of ethylene oxide had been reacted, the reaction rate became slow and an additional 2.0 grams of boron trifluoride-diethyl ether complex added. The reaction then progressed smoothly with addition of the ethylene oxide being completed over a period of 2 hours. The product was a yellow colored liquid and was slightly viscous at 25° C. The product was neutralized by adding 2.2 N sodium carbonate solution to the product and then heating to 150° C. to remove water and any volatile by-products. The product was then filtered to remove a salt precipitate formed during the neutralization process. The product had an average molecular weight of approximately 2280 as determined by hydroxyl number.

EXAMPLE III

Step 1

Into a 2-liter Parr pressure reactor were added 18 grams of water and 4 grams of a boron trifluoride-ether complex. The lines of the reactor were flushed with nitrogen gas and a pressure of about 10 pounds per square inch developed therein. Then a mixture of 54.14 grams of epichlorohydrin and 485.25 grams of styrene oxide were added to the reactor over a period of 2 hours and 10 minutes. The temperature of the reactor during this time was approximately 65 to 75° C. and the pressure ranged from 3 to 16 pounds per square inch. The intermediate product formed from this reaction was a transparent yellow colored liquid which was quite viscous in nature.

Step 2

Two hundred grams of the above intermediate transparent yellow liquid product were charged into a 2-liter Parr pressure reactor together with 1 gram of the boron trifluoride-ether complex. The reactor was then flushed with nitrogen gas developing a pressure of 10 pounds per square inch. The addition of 300 grams of ethylene oxide was then begun at a temperature of 32° C. The temperature rose during the reaction and was finally maintained within the range of 65 to 75° C. The addition of ethylene oxide required 2 hours and 5 minutes for completion. The pressure ranged from 10 to 12 pounds per square inch during the reaction. The final product was a yellow liquid which was quite viscous in nature.

EXAMPLE IV

Step 1

Approximately 202 grams of the intermediate product obtained in Step 1 of Example III were charged into a 2-liter Parr pressure reactor together with 1 gram of boron trifluoride-ether complex. The lines of the reactor were flushed with nitrogen gas developing a pressure of 10 pounds per square inch. Then 19.38 grams of epichlorohydrin and 174.44 grams of styrene oxide in physical admixture were charged into the reactor. The addition of this mixture required 1 hour and 10 minutes. The temperature at the start of the addition was 30° C. and heat was applied to raise the temperature to 70° C. near the end of the addition. The pressure varied from 6 to 11 pounds per square inch during the reaction. The resulting intermediate product was a transparent yellow-green liquid.

Step 2

Two hundred grams of the above intermediate product together with 1 gram of boron trifluoride-ether complex were then charged into a 2-liter Parr pressure reactor and the lines flushed with nitrogen gas to develop a pressure of 10 pounds per square inch. At a temperature of 46° C. the addition of 300 grams of ethylene oxide was started. The temperature decreased and heat was applied to raise the temperature. The addition of ethylene oxide continued for 1 hour and 15 minutes and the pressure varied from 20 to 30 pounds per square inch during the reaction. The temperature during the major part of the reaction varied from 65 to 75° C. and an additional 1 gram of boron trifluoride catalyst complex was required. The final product was a yellow viscous liquid.

EXAMPLE V

Step 1

Into a 2-liter Parr pressure reactor there was added 18 grams of water and 4 grams of a boron trifluoride-ether complex. The reactor was flushed with nitrogen gas and a pressure of 10 pounds per square inch developed therein. Then 158.28 grams of epichlorohydrin and 974.50 grams of butylene oxide were physically mixed and added to the reactor slowly over a period of 6 hours and 15 minutes. The addition of this mixture was started at 30° C. and the temperature increased and was maintained within the range of 65 to 75° C. during the major part of the reaction. The pressure ranged from 4 pounds per square inch to 36 pounds per square inch with the higher pressure being observed during the end of the reaction. After about 595 grams of the epichlorohydrin-butylene oxide mixture had been added the reaction rate became very slow and an additional 2 grams of boron trifluoride-ether complex was added. Again after about 960 grams of this mixture had been added, an additional 2 grams of the boron trifluoride-ether complex were added. The intermediate product resulting from this reaction was a light yellow colored liquid, slightly viscous in nature.

Step 2

Two hundred grams of the above intermediate product together with 1 gram of boron trifluoride-ether complex were charged into a 2-liter Parr pressure reactor under a pressure of 10 pounds per square inch. The addition of 300 grams of ethylene oxide was started at a temperature of 34° C. The addition of ethylene oxide continued for a period of 1 hour and 15 minutes and the pressure ranged from 9 to 16 pounds per square inch. The temperature during the major part of the reaction was in the range of 60 to 70° C. The product was a pale yellow liquid, slightly viscous in nature, and had a refractive index of 1.4582 at 25° C. A 10% aqueous solution of the final product had a cloud point of 28.5–29.5° C. The average molecular weight of the product was 2292 as determined by hydroxyl number.

EXAMPLE VI

Step 1

A pressure reactor was charged with 1.63 grams of propylene oxide and 76.87 grams of cyclohexane. The lines and the pressure reactor were flushed with nitrogen gas. Anhydrous boron trifluoride gas was added to the reactor bubbling through the liquid therein. At a temperature of approximately 27° C., 46.26 grams of epichlorohydrin and 493.50 grams of propylene oxide were added at a controlled rate to the reactor. The addition of this mixture required 3 hours and 36 minutes and was performed at a maximum temperature in the range of 60 to 70° C. The intermediate product was a dark brown viscous liquid.

Step 2

Into a 2-liter Parr pressure reactor were added 308.31 grams of the product resulting from Step 1. The addition of 358.75 grams of ethylene oxide was then started at a temperature of about 27° C. without the addition of additional catalyst. After approximately 35 grams of ethylene oxide had been added it was necessary to add additional boron trifluoride catalyst. The addition of the ethylene oxide was performed over a period of 2 hours and 45 minutes and at a temperature in the range of 55 to 75° C. The final product was a dark brown viscous liquid. The product had a refractive index of 1.4470 at 25° C. and a hydroxyl value of 30.6 mg. KOH/g. of sample. The average molecular weight as determined by hydroxyl value was 3665.

Infrared analysis of the final reaction products of the invention shows absorption at 13.4 microns, evidencing the presence of chlorine in the molecule.

The utility of the products of the invention for use as surface active agents is demonstrated by the low surface tension of these products at temperatures above room temperature. Surface tension measurements were carried out on 0.1% aqueous solutions of the new products at temperatures above room temperature by measuring the rise in a capillary tube of the various test solutions. The surface tension results were as follows:

| Degrees C.: | Dynes/cm. |
|---|---|
| 26 | 45.2 |
| 30 | 37.8 |
| 35 | 35.2 |
| 40 | 34.2 |

To further evaluate the utility of the compounds of the invention as surface active agents and particularly as rinse agents, contact angle measurements were made on aqueous solutions containing products of the invention at a concentration of 0.01%. Contact angle measurement is a commonly used method in the science of surface active study in which the ability of a liquid to wet a solid may be measured in numbers, the lower the contact angle the better the wetting. To measure the contact angle a source of light is focused on a drop of test liquid which is placed on a particular solid surface of interest. The profile of the drop (in the form of a shadow) is then magnified and projected to a projection screen upon which is mounted a suitable goniometer. The angle that the test liquid makes with the surface at the point of contact is measured by placing the vertex of the goniometer at the point of contact of the test drop and the surface and moving the radial line of the gonimeter to the surface of the drop at the point of contact. The numeral is then read directly off the goniometer.

Using this method of evaluation, products of this invention were compared with a commercially available nonionic surfactant on three types of surfaces commonly encountered in the rinsing of dishware, namely stainless steel, plastic and glass. The results of this study were as follows:

| | Contact Angle on Stainless Steel | Contact Angle on Plastic | Contact Angle on Glass |
|---|---|---|---|
| Surfactant of Invention | 38 degrees, 5 min. | 61 degrees, 26 min. | 32 degrees, 9 min. |
| Prior Art Surfactant | 50 degrees, 5 min. | 64 degrees, 1 min. | 33 degrees, 53 min. |

The above data shows that the products of the invention afford much better wetting of stainless steel and plastic than the commercially available surfactant and are equal thereto with respect to wetting glass.

The advantages of the present invention are manifest from the foregoing description and data. The novel compositions of the invention possess superior surface active properties. The new compositions comprise a copolymeric moiety in which chlorine groups are randomly distributed. These new surfactants exhibit low surface tension at elevated temperatures and show improved ability to wet plastic and stainless steel materials as evidenced by contact angle measurement.

The processes for preparing the new surfactants described herein also afford significant advantages. By the use of a boron trifluoride catalyst, the reactions involved proceed at unusually fast rate thus decreasing the overall reaction time and enhancing the commercial attractiveness. The disclosed synthesis eliminates the need for a starting material having one or more reactive hydrogen groups, nor is water required in the system for hydrolysis reactions in order to initiate reactions.

Those modifications and equivalents which fall within the spirit of the invention and the scope of the appended claims are to be considered part of the invention.

We claim:

1. A composition of matter comprising a copolymer of epichlorohydrin and an epoxy compound selected from the group consisting of ethylene oxide, propylene oxide, butylene oxide and styrene oxide, said copolymer having a molecular weight in the range from about 1200 to 1500 as determined by hydroxyl number, said copolymer being further reacted through an oxy linkage with oxyethylene groups with the oxyethylene groups constituting from about 40 to 70% by weight of the final composition and the molecular weight of the final composition ranging from about 1800 to 3700 as determined by hydroxyl number.

2. The composition according to claim 1 wherein the weight ratio of the epoxy compound to epichlorohydrin in the copolymer varies from about 5:95 to 95:5.

3. A composition of matter comprising a copolymer of epichlorohydrin and propylene oxide having a molecular weight in the range from about 1200 to 1500 as determined by hydroxyl number, said copolymer being further reacted through an oxy linkage with oxyethylene groups with the oxyethylene groups constituting from about 40 to 70% by weight of the final composition and the molecular weight of the final composition ranging from about 1800 to 3700 as determined by hydroxyl number.

4. A composition of matter comprising a copolymer of epichlorohydrin and styrene oxide having a molecular weight in the range from about 1200 to 1500 as determined by hydroxyl number, said copolymer being further reacted through an oxy linkage with oxyethylene groups with the oxyethylene groups constituting from about 40 to 70% by weight of the final composition and the molecular weight of the final composition ranging from about 1800 to 3700 as determined by hydroxyl number.

5. A composition of matter comprising a copolymer of epichlorohydrin and butylene oxide having a molecular weight in the range from about 1200 to 1500 as determined by hydroxyl number, said copolymer being further reacted through an oxy linkage with oxyethylene groups with the oxyethylene groups constituting from about 40 to 70% by weight of the final composition and the molecular weight of the final composition ranging from about 1800 to 3700 as determined by hydroxyl number.

6. A process of preparing a composition of matter which comprises reacting epichlorohydrin with an epoxy compound selected from the group consisting of ethylene oxide, propylene oxide, butylene oxide and styrene oxide, in the presence of boron trifluoride at a temperature not substantially in excess of 100° C. to form an intermediate copolymer having a molecular weight from about 1200 to 1500 as determined by hydroxyl number, and then reacting said intermediate copolymer with ethylene oxide in the presence of boron trifluoride at a temperature not substantially in excess of 100° C., said ethylene oxide being employed in an amount to constitute from about 40 to 70% by weight of the final composition with the molecular weight of the final composition ranging from about 1800 to 3700 as determined by hydroxyl number.

7. A process of preparing a composition of matter which comprises reacting epichlorohydrin with an epoxy compound selected from the group consisting of ethylene oxide, propylene oxide, butylene oxide and styrene oxide, in the presence of boron trifluoride at a temperature in the range from about 50 to 70° C. and at a pressure ranging from about 10 to 30 pounds per square inch to form an intermediate copolymer having a molecular weight from about 1200 to 1500 as determined by hydroxyl number and then reacting said intermediate copolymer with ethylene oxide in the presence of boron trifluoride at a temperature in the range from about 50 to about 70° C. and at a pressure ranging from about 10 to 30 pounds per square inch, said ethylene oxide being employed in an amount to constitute from about 40 to 70% by weight of the final composition with the molecular weight of the final composition ranging from about 1800 to 3700 as determined by hydroxyl number.

8. A process of preparing a composition of matter which comprises reacting epichlorohydrin with an epoxy compound selected from the group consisting of ethylene oxide, propylene oxide, butylene oxide and styrene oxide, in the presence of boron trifluoride at a temperature not substantially in excess of 100° C. to form an intermediate copolymer having a molecular weight from about 1200 to 1500 as determined by hydroxyl number and then reacting said intermediate copolymer with ethylene oxide in the presence of boron trifluoride at a temperature not in excess of 100° C., said ethylene oxide being employed in an amount to constitute from about 40 to 70% by weight of the final composition with the molecular weight of the final composition ranging from about 1800 to 3700 as determined by hydroxyl number, neutralizing said final reaction product with a base, separating precipitated salts therefrom and heating the final reaction product to a temperature not in excess of 150° C. to drive off volatile materials.

9. A process of preparing a composition of matter which comprises reacting epichlorohydrin with an epoxy compound selected from the group consisting of ethylene oxide, propylene oxide, butylene oxide and styrene oxide, in the presence of boron trifluoride at a temperature ranging from about 50 to 70° C. and at a pressure ranging from 10 to 30 pounds per square inch to form an intermediate copolymer having a molecular weight from about 1200 to 1500 as determined by hydroxyl number and then reacting said intermediate copolymer with ethylene oxide in the presence of boron trifluoride at a temperature not in excess of 100° C. and at a pressure ranging from 10 to 30 pounds per square inch, said ethylene oxide being employed in an amount to constitute from about 40 to 70% by weight of the final composition with the molecular weight of the final composition ranging from about 1800 to 3700 as determined by hydroxyl number, neutralizing said final reaction product with a base, separating precipitated salts therefrom and heating the final reaction product to a temperature not in excess of 150° C. to drive off volatile materials.

10. A process of preparing a composition of matter which comprises reacting epichlorohydrin with propylene oxide in the presence of boron trifluoride at a temperature not substantially in excess of 100° C. to form an intermediate copolymer having a molecular weight from about 1200 to 1500 as determined by hydroxyl number, and then reacting said intermediate copolymer with ethylene oxide in the presence of boron trifluoride at a temperature not substantially in excess of 100° C., said ethylene oxide being employed in an amount to constitute from about 40 to 70% by weight of the final composition with the molecular weight of the final composition ranging from about 1800 to 3700 as determined by hydroxyl number.

11. A process of preparing a composition of matter which comprises reacting epichlorohydrin with butylene oxide in the presence of boron trifluoride at a temperature not substantially in excess of 100° C. to form an intermediate copolymer having a molecular weight from about 1200 to 1500 as determined by hydroxyl number, and then reacting said intermediate copolymer with ethylene oxide in the presence of boron trifluoride at a temperature not substantially in excess of 100° C., said ethylene oxide being employed in an amount to constitute from about 40 to 70% by weight of the final composition with the molecular weight of the final composition ranging from about 1800 to 3700 as determined by hydroxyl number.

12. A process of preparing a composition of matter which comprises reacting epichlorohydrin with styrene oxide in the presence of boron trifluoride at a temperature not substantially in excess of 100° C. to form an intermediate copolymer having a molecular weight from about 1200 to 1500 as determined by hydroxyl number, and then reacting said intermediate copolymer with ethylene oxide in the presence of boron trifluoride at a temperature not substantially in excess of 100° C., said ethylene oxide being employed in an amount to constitute from about 40 to 70% by weight of the final composition with the molecular weight of the final composition ranging from about 1800 to 3700 as determined by hydroxyl number.

References Cited

UNITED STATES PATENTS

| | | | |
|---|---|---|---|
| 2,498,195 | 2/1950 | Ballard et al. | 260—2 |
| 2,641,614 | 6/1953 | Britton et al. | 260—611 |
| 2,828,345 | 3/1958 | Spriggs et al. | 260—615 |
| 3,078,280 | 2/1963 | Ploetz et al. | 260—2 XR |

WILLIAM H. SHORT, *Primary Examiner.*

T. E. PERTILLA, *Assistant Examiner.*